United States Patent
Fueki

(10) Patent No.: US 9,416,836 B2
(45) Date of Patent: Aug. 16, 2016

(54) SPRING ASSEMBLY

(75) Inventor: Toshie Fueki, Yokohama (JP)

(73) Assignee: PIOLAX, INC, Yokohama-shi, Kanagawa (JP)

( * ) Notice: Subject to any disclaimer, the term of this patent is extended or adjusted under 35 U.S.C. 154(b) by 0 days.

(21) Appl. No.: 14/002,330

(22) PCT Filed: Feb. 29, 2012

(86) PCT No.: PCT/JP2012/055030
§ 371 (c)(1),
(2), (4) Date: Aug. 29, 2013

(87) PCT Pub. No.: WO2012/121072
PCT Pub. Date: Sep. 13, 2012

(65) Prior Publication Data
US 2013/0334750 A1    Dec. 19, 2013

(30) Foreign Application Priority Data

Mar. 4, 2011 (JP) ................... 2011-047522

(51) Int. Cl.
*F16F 3/04* (2006.01)
*F16D 25/12* (2006.01)
*F16F 1/12* (2006.01)

(52) U.S. Cl.
CPC . *F16F 3/04* (2013.01); *F16D 25/12* (2013.01); *F16F 1/125* (2013.01)

(58) Field of Classification Search
CPC .............. F16D 25/12; F16F 1/125; F16F 3/04
USPC ......... 267/166, 170, 168, 174, 178, 179, 286, 267/288
See application file for complete search history.

(56) References Cited

U.S. PATENT DOCUMENTS

| 1,878,128 A | * | 9/1932 | Griswold ....................... 267/286 |
| 2,278,324 A | * | 3/1942 | Kollmann ..................... 403/182 |
| 2,412,712 A | * | 12/1946 | Brown ............................ 29/623 |
| 2,700,788 A | * | 2/1955 | Hennelly ....................... 16/86 A |

(Continued)

FOREIGN PATENT DOCUMENTS

| CN | 2014 39809 U | 4/2010 |
| DE | 40 19 072 A1 | 12/1990 |

(Continued)

OTHER PUBLICATIONS

International Search Report dated Jun. 5, 2012 with English translation thereof.

(Continued)

*Primary Examiner* — Robert A Siconolfi
*Assistant Examiner* — Charles Poon
(74) *Attorney, Agent, or Firm* — McGinn IP Law Group PLLC

(57) ABSTRACT

A supporting projection is formed on a resin base plate on which a seat winding portion of a coil spring is fitted. The supporting projection has such rigidity that a distal end portion does not deflect against a spring force applied radially inwards from the seat winding portion of the coil spring. On the other hand, an elastic deflectable area which deflects elastically by the spring force applied radially outwards from the seat winding portion of the coil spring is formed in an area which extends from a proximal end to the distal end portion of the supporting projection.

18 Claims, 7 Drawing Sheets

(56) References Cited

U.S. PATENT DOCUMENTS

| | | | |
|---|---|---|---|
| 3,531,069 A * | 9/1970 | Dubberley | 248/565 |
| 4,590,900 A * | 5/1986 | Hayashi | 123/90.67 |
| 4,830,348 A * | 5/1989 | Seyler | 267/166 |
| 5,772,191 A * | 6/1998 | Nakano et al. | 267/289 |
| 6,076,841 A * | 6/2000 | Satou et al. | 280/124.179 |
| 2006/0024175 A1 | 2/2006 | Yagi et al. | |
| 2006/0208406 A2* | 9/2006 | Al-Dahhan et al. | 267/220 |
| 2007/0194507 A1* | 8/2007 | Kato et al. | 267/179 |
| 2008/0073167 A1* | 3/2008 | Youd et al. | 188/378 |
| 2008/0211155 A1* | 9/2008 | Check et al. | 267/170 |
| 2008/0211156 A1* | 9/2008 | Check et al. | 267/170 |
| 2010/0320660 A1* | 12/2010 | Takeda et al. | 267/168 |
| 2011/0303046 A1* | 12/2011 | Gentry | 74/560 |

FOREIGN PATENT DOCUMENTS

| | | | | |
|---|---|---|---|---|
| GB | 1044113 | A | | 9/1966 |
| JP | 59-191439 | | | 12/1984 |
| JP | 61-112139 | U | | 7/1986 |
| JP | 01307530 | A | * | 12/1989 ............... F16F 1/12 |
| JP | 5-126189 | A | | 5/1993 |
| JP | 2002-295558 | A | | 10/2002 |
| JP | 2006-37953 | A | | 2/2006 |
| JP | 2007-24278 | A | | 2/2007 |
| JP | 2007024278 | A | * | 2/2007 |
| JP | 2007-292271 | A | | 11/2007 |
| JP | 2007292271 | A | * | 11/2007 |
| JP | 2009-68590 | A | | 4/2009 |
| JP | 2010-7772 | A | | 1/2010 |

OTHER PUBLICATIONS

International Preliminary Examination on Patentability under Chapter II.

Chinese Office Action dated Dec. 19, 2014 with English translation thereof.

* cited by examiner

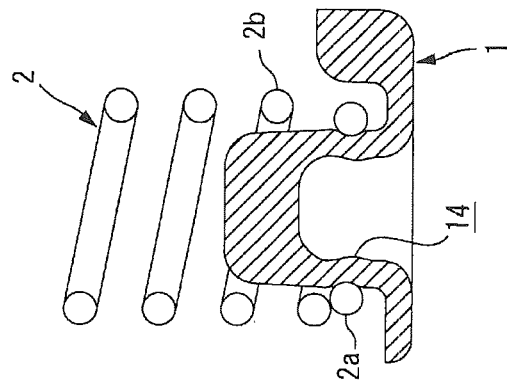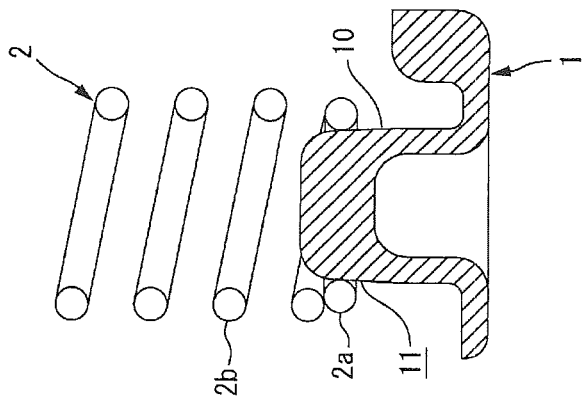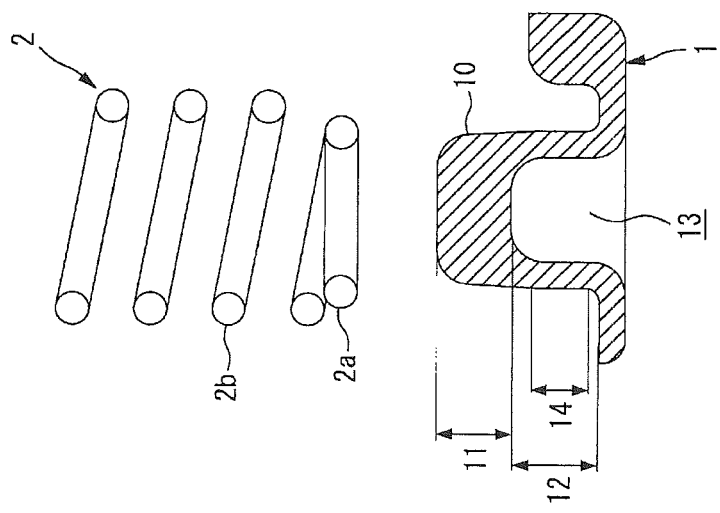

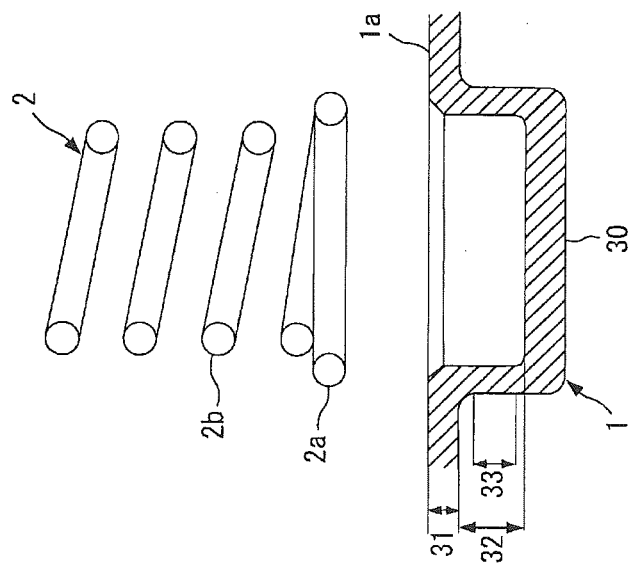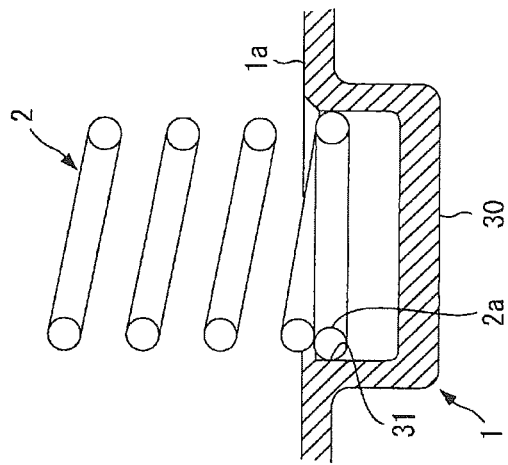

SPRING ASSEMBLY

TECHNICAL FIELD

The present invention relates to a spring assembly which is used, for example, as a return spring mechanism of a multiple disc clutch piston in a clutch mechanism of an automatic transmission of a motor vehicle.

BACKGROUND ART

Patent Literature 1 discloses a conventional spring assembly of this type. Although not shown specifically, in the spring assembly of Patent Literature 1, two spring retainers (R1, R2) are formed of a synthetic resin material. A mounting portion (2) projects from each of the spring retainers (R1, R2). After a coil spring (1) is fitted on this mounting portion (2), the mounting portion (2) is heat crimped so as to form a constriction (3) in a base portion, whereby the dislocation of the coil spring (1) is prevented.

Bracketed reference numerals represent numerals in Patent Literature 1.

In the related art configured, in order to prevent the dislocation of the coil spring (1) fitted on the mounting portion (2) on the spring retainers (R1, R2), the working step of heat crimping the mounting portion (2) is necessary. Thus, the assembling work becomes complex and troublesome, or the cycle time delays as the number of working steps increases. Further, since equipment (crimping device) which heats and collapses forcibly the mounting portion (2) is necessary, the equipment cost is increased.

CITATION LITERATURE

Patent Literature

Patent Literature 1
JP-H05-126189-A

DISCLOSURE OF THE INVENTION

Problem That the Invention is to Solve

The invention has been made in view of the above-described situations, and an object thereof is to provide a spring assembly which can restrain the dislocation of a coil spring only by fitting the coil spring on or in a supporting projection or a supporting recess formed on or in a resin base plate without heat crimping work.

Means for Solving the Problem

In order to attaining the object, the invention provides a spring assembly, including:
resin base plates;
a coil spring having seat winding portions fixed to the resin base plates; and
a supporting projection formed on each of the resin base plates so as to be fitted with the seat winding portion of the coil spring, the supporting projection including:
a distal end portion having rigidity so as not to deflect against a spring force applied radially inwards from the seat winding portion of the coil spring;
a proximal end; and
an elastic deflectable area formed within an area which extends from the proximal end to the distal end portion so as to deflect elastically by the spring force applied radially inwards from the seat winding portion of the coil spring.

According to the above-described configuration of the invention, when the seat winding portion of the coil spring is fitted on the supporting projection, firstly, at the distal end portion of the supporting projection, since the rigidity is high, the coil spring moves along the distal end portion with the seat winding portion of the coil spring expanded forcibly. Then, when the seat winding portion of the coil spring reaches the elastic deflectable area of the supporting projection, the area deflects elastically and contracts diametrically in the same direction by a radial-inward spring force applied from the seat winding portion of the coil spring. By the constriction, even though a drawing force is applied to the seat winding portion of the coil spring, since the distal end portion of the supporting projection functions as a stopper, the dislocation of the coil spring is restrained.

According to the invention, it is possible to restrain the dislocation of the coil spring only by fitting the winding portion of the coil spring on or in the supporting projection or a supporting recess formed on or in the resin base plate without requiring the heat crimping work.

BRIEF DESCRIPTION OF THE DRAWINGS

FIGS. 3A to 3C are enlarged sectional views of a main part which illustrate the configuration and function of a supporting projection of the spring assembly according to the first embodiment of the invention.

FIGS. 4A to 4C are enlarged sectional views of a main part which illustrate the configuration and function of a supporting recess of a spring assembly according to a second embodiment of the invention.

DESCRIPTION OF REFERENCE NUMERALS

1: resin base plate; 2: coil spring; 2a: seat winding portion; 2b: intermediate winding portion; 3: second coil spring; 10: supporting projection; 11: distal end portion; 12: area extending from proximal end to distal end portion; 13: groove; 14: elastic deflectable area; 30: supporting recess; 31: opening edge portion; 32 area extending from bottom portion to opening edge portion; 33: elastic deflectable area; 34 protrusion 40: circumferential wall; 41: slit; 42: elastic deflectable area; 43: supporting wall.

BEST MODE FOR CARRYING OUT THE INVENTION

Hereinafter, an embodiment will be described in detail with reference to the drawings. In the embodiment, a spring assembly according to the invention is applied to a return spring mechanism of a multiple disc clutch piston in a clutch mechanism of an automatic transmission of a motor vehicle. The application of the spring assembly according to the invention is not, of course, limited thereto.

Figure 1:
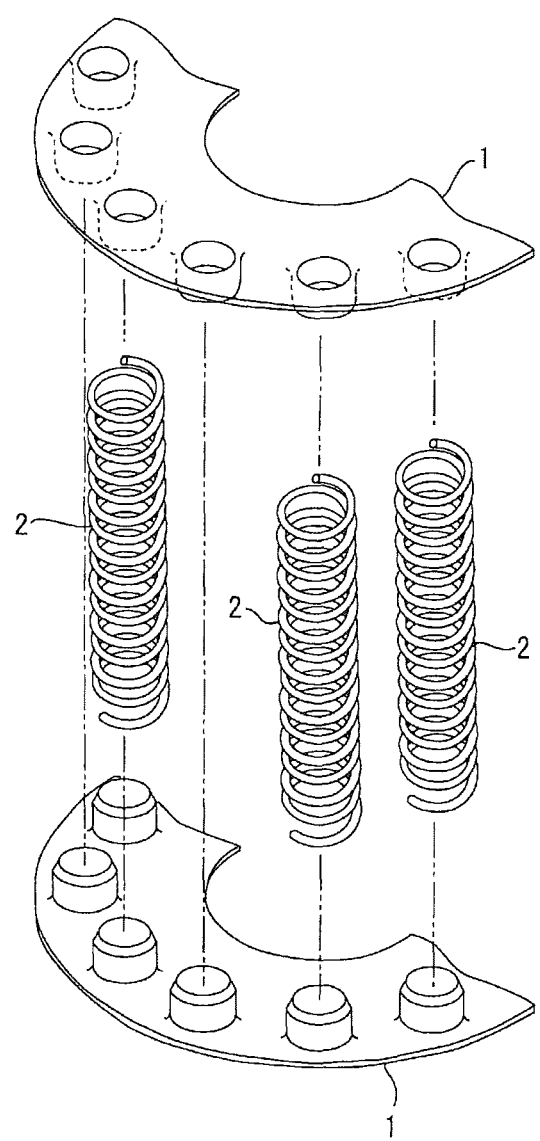
FIG. 1 is an exploded perspective view showing schematically a spring assembly according to the invention applied to a return spring mechanism of a multiple disc clutch piston in a clutch mechanism of an automatic transmission of a motor vehicle.

FIG. 1 is an exploded perspective view showing schematically a spring assembly according to the invention applied as a return spring mechanism of a multiple disc clutch piston in a clutch mechanism of an automatic transmission of a motor vehicle.

The spring assembly applied to the return spring mechanism of the multiple disc clutch piston in the clutch mechanism of the automatic transmission of the motor vehicle includes a pair of annular resin base plates 1 and plural coil springs 2, and the coil springs 2 are fixed to the resin base plates 1 at regular intervals at seat winding portions at both ends of each coil spring 2.

First Embodiment

Figure 2A:
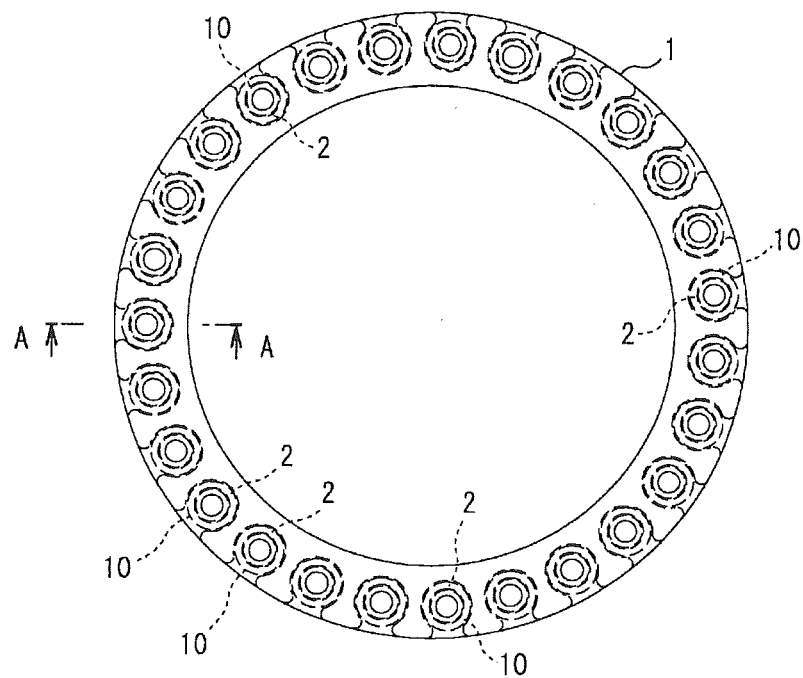
FIG. 2A is a bottom view showing an overall configuration of a spring assembly according to a first embodiment of the invention.
Figure 2B:
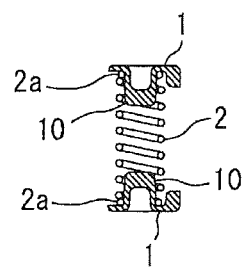
FIG. 2B is a sectional view of the same spring assembly taken along the line A-A.

FIGS. 2A, 2B are diagrams showing an overall configuration of the spring assembly according to a first embodiment of the invention, and FIGS. 3A to 3C are diagrams showing a main part of the same spring assembly in an enlarged fashion.

In the spring assembly of this embodiment, plural supporting projections 10 are formed on resin base plates 1 so that seat winding portions 2a of coil springs 2 are to be fixedly fitted thereon. The supporting projections 10 project from a front surface of each of the resin base plates 1 at regular circumferential intervals.

The supporting projection 10 has a circular outer circumferential surface, and the seat winding portion 2a of the coil spring 2 is fitted on the supporting projection 10 in an axial direction from a distal end thereof so as to be fittingly fixed thereto.

As shown in FIGS. 3A to 3C in an enlarged fashion, a distal end portion (area) 11 of the supporting projection 10 is formed solid so as to have such rigidity as not to deflect against a spring force applied radially inwards from the seat winding portion 2a of the coil spring 2.

On the other hand, an area 12 which extends from a proximal end to the distal end portion 11 of the supporting projection 10 is hollowed by a groove 13 which extends in the axial direction from a rear surface side of the resin base plate 1, and an elastic deflectable area 14 is formed within the area 12. This elastic deflectable area 14 is configured of a thin circumferential wall so as to deflect elastically by the spring force applied radially inwards from the seat winding portion 2a of the coil spring 2. Thus, the elastic deflectable area 14 of the supporting projection 10 can be formed by simply employing the thin circumferential wall. This elastic deflectable area 14 may be formed over the whole of the area 12 extending from the proximal end to the distal end portion 11 of the supporting projection 10 or partially thereof.

In the coil spring 2, the seat winding portion 2a which is a first coil at each end of the coil spring 2 is contracted diametrically more than the remaining intermediate winding portion 2b. A bore diameter of the seat winding portion 2a is made smaller than an outside diameter of the supporting projection 10, so that the seat winding portion 2a is fitted on the distal end portion 11 of the supporting projection 10 while being expanded diametrically in an elastic fashion. On the other hand, a bore diameter of the intermediate winding portion 2b of the coil spring 2 is made larger than the outside diameter of the supporting projection 10 so that a gap is formed between the intermediate winding portion 2b and the supporting projection 10. By this configuration, the spring properties of the intermediate winding portion 2b are prevented from being affected by the supporting projection 10, thereby maintaining the stable spring properties.

Next, referring to FIGS. 3A to 3C, the function of the spring assembly according to this embodiment will be described.

As shown in FIG. 3A, the seat winding portion 2a of the coil spring 2 is placed so as to face the distal end portion 11 of the supporting projection 10 formed on the resin base plate 1, and then, the coil spring 2 is moved in the axial direction towards the supporting projection 10 so as to be fitted thereon. Then, as shown in FIG. 3B, the seat winding portion 2a of the coil spring 2 is brought into abutment with the distal end portion 11 of the supporting projection 10, and is then fitted thereon while being expanded diametrically in an elastic fashion. The distal end portion 11 of the supporting projection 10 has such rigidity as not to deflect even though the radial-inward spring force is applied from the seat winding portion 2a of the coil spring 2.

When the coil spring 2 is fitted further on the supporting projection 10, the seat winding portion 2a reaches the elastic deflectable area 14 of the supporting projection 10, as shown in FIG. 3C. When the radial-inward spring force is applied from the seat winding portion 2a of the coil spring 2, the elastic deflectable area 14 deflects elastically by the applied spring force and contracts diametrically in the same direction. By the constriction, even though a drawing force is applied to the seat winding portion 2a of the coil spring 2, the distal end portion 11 of the supporting projection 10 functions as a stopper to thereby prevent the dislocation of the coil spring 2 from the supporting projection 10.

The deflecting amount (constricting amount) of the elastic deflectable area 14 of the supporting projections 10 may be small, and the constriction may not be recognized visually.

The resin base plate 1 including the supporting projections 10 does not have lateral irregularities both on the front surface and the rear surface thereof, and thus can be resin molded only by a vertically-movable mold. By forming the base plate 1 into that shape, since a horizontally-movable slider mold can be omitted, not only is the cost for the mold used remarkably reduced, but also the workability is increased.

As a comparison example, in a spring unit of JP-2009-068590-A, irregularities exist on an outer circumferential surface of a mounting and locking projecting portion, and resin molding therefor require not only a vertically-movable main mold but also a horizontally-movable slider mold.

Second Embodiment

FIGS. 4A to 4C are diagrams showing a main part of a spring assembly according to a second embodiment of the invention in an enlarged fashion.

In the spring assembly of this embodiment, plural supporting recesses 30 are formed in resin base plates 1 so that seat winding portions 2a of coil springs 2 are to be fixedly fitted therein. The supporting recesses 30 are formed at regular circumferential intervals in a front surface of each of the resin base plates 1.

The supporting recess 30 has a circular inner circumferential surface, and the seat winding portion 2a of the coil spring 2 is fitted in the supporting recess 30 in an axial direction from a distal end so as to be fittingly fixed therein.

As shown in FIGS. 4A to 4C in an enlarged fashion, an opening edge portion 31 of the supporting recess 30 is surrounded by a base portion 1a of the resin base plate 1, and therefore, the opening edge portion 31 has such rigidity as not to deflect against a radial-outward spring force applied from the seat winding portion 2a of the coil spring 2 when the coil spring 2 is fitted in the supporting recess 30.

On the other hand, an area 32 which extends from a bottom portion to the opening edge portion 31 of the supporting recess 30 is formed of a cylindrical wall which extends towards a rear surface side of the resin base plate 1, and an elastic deflectable area 33 is formed within the area 32. This elastic deflectable area 33 is configured of the thin cylindrical wall so as to deflect elastically by the spring force applied radially outwards from the seat winding portion 2a of the coil spring 2. Thus, the elastic deflectable area 33 of the supporting recess 30 can be formed by simply employing the thin cylindrical wall. This elastic deflectable area 33 may be formed over the whole of the area 32 extending from the bottom portion to the opening circumferential edge portion 31 of the supporting recess 30 or partially thereof.

In the coil spring 2, the seat winding portion 2a which is a first coil at each end of the coil spring 2 is contracted diametrically more than the remaining intermediate winding portion 2b. An outside diameter of the seat winding portion 2a is made larger than a bore diameter of the supporting recess 30, so that the seat winding portion 2a is fitted in the opening edge portion 31 of the supporting recess 30 while being contracted diametrically in an elastic fashion. On the other hand, an outside diameter of the intermediate winding portion 2b of the coil spring 2 is made smaller than the bore diameter of the supporting recess 30 so that a gap is formed between the intermediate winding portion 2b and the supporting recess 30. By this configuration, the spring properties of the intermediate winding portion 2b are prevented from being affected by the supporting recess 30, thereby maintaining the stable spring properties.

Next, referring to FIGS. 4A to 4C, the function of the spring assembly according to this embodiment will be described.

As shown in FIG. 4A, the seat winding portion 2a of the coil spring 2 is placed so as to face the opening edge portion 31 of the supporting recess 30 formed in the resin base plate 1, and then, the coil spring 2 is moved in the axial direction towards the supporting recess 30 so as to be fitted therein. Then, as shown in FIG. 4B, the seat winding portion 2a of the coil spring 2 is brought into abutment with the opening edge portion 31 of the supporting recess 30, and is then fitted therein while being contracted diametrically in an elastic fashion. The opening edge portion 31 of the supporting recess 30 has such rigidity as not to deflect even though the radial-outward spring force is applied from the seat winding portion 2a of the coil spring 2.

When the coil spring 2 is fitted further in the supporting recess 30, the seat winding portion 2a reaches the elastic deflectable area 33 of the supporting recess 30, as shown in FIG. 4C. When the radial-outward spring force is applied from the seat winding portion 2a of the coil spring 2, the elastic deflectable area 33 deflects elastically by the applied spring force and expands diametrically in the same direction. By the expansion, even though a drawing force is applied to the seat winding portion 2a of the coil spring 2, the opening edge portion 31 of the supporting recess 30 functions as a stopper to thereby prevent the dislocation of the coil spring 2 from the supporting recess 30.

The deflecting amount (expanding amount) of the elastic deflectable area 33 of the supporting recesses 30 may be small, and the expansion may not be recognized visually.

In this embodiment, too, the resin base plate 1 including the supporting recesses 30 does not have lateral irregularities both on the front surface and the rear surface thereof, and thus can be resin molded only by a vertically-movable mold. By forming the base plate 1 into that shape, since a horizontally-movable slider mold can be omitted, not only is the cost for the mold used remarkably reduced, but also the workability is increased.

Other Embodiments

The invention is not limited to the above-described embodiments, and can be variously modified without departing from the spirit and scope of the invention.

Figure 5:
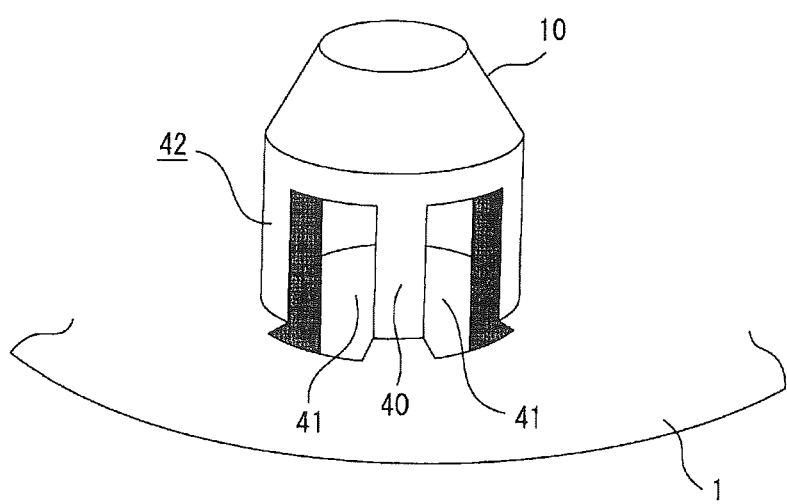
FIG. 5 is a perspective view showing a modified example of the first embodiment according to the invention.

For example, as a modified example of the above-described first embodiment, as shown in FIG. 5, a supporting projection 10 may be hollowed, and plural axial slits 41 may be formed in a circumferential wall 40, whereby an elastic deflectable area 42 is formed in the circumferential wall 40, so that the area 42 can deflect elastically by a spring force applied radially inwards from a seat winding portion 2a of a coil spring 2.

Similarly, although not shown, as another modified example of the above-described first embodiment, plural axial slits 99 may be formed in a cylindrical wall of a supporting recess 30, whereby an elastic deflectable area is formed in the cylindrical wall, so that the elastic deflectable area can deflect elastically by a spring force applied radially outwards from a seat winding portion 2a of a coil spring 2.

Figure 6:
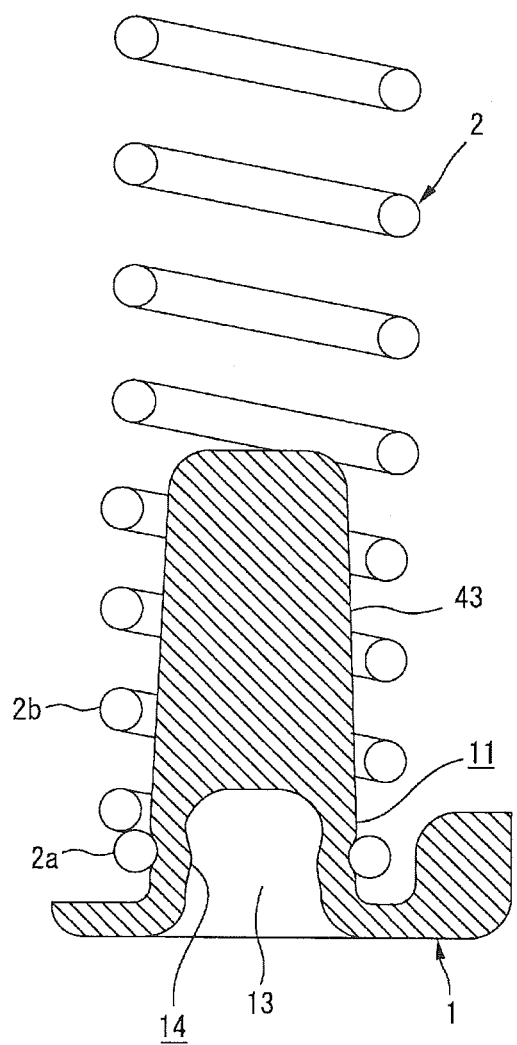
FIG. 6 is a front sectional view showing a modified example of the first embodiment according to the invention.

FIG. 6 shows a modified example of the first embodiment, in which the height of the supporting projection 10 is extended so as to form a supporting wall 43 which prevents the buckling of the intermediate winding portion 2b of the coil spring 2.

A slight gap may be provided between the supporting wall 43 and the intermediate winding portion 2b of the coil spring 2 so as to eliminate the influence on the spring properties of the coil spring 2. In this case, when the coil spring 2 deflects in a lateral direction, the coil spring 2 is brought into abutment with the supporting wall 43, whereby the buckling of the coil spring 2 is prevented.

When the strength of the elastic deflectable area 14 is insufficient, an axial rib may be provided on an inner circumferential surface of the hollow portion so as to reinforce the elastic deflectable area 14 to such an extent that the same area 14 can deflect elastically by the spring force of the coil spring 2.

Figure 7:
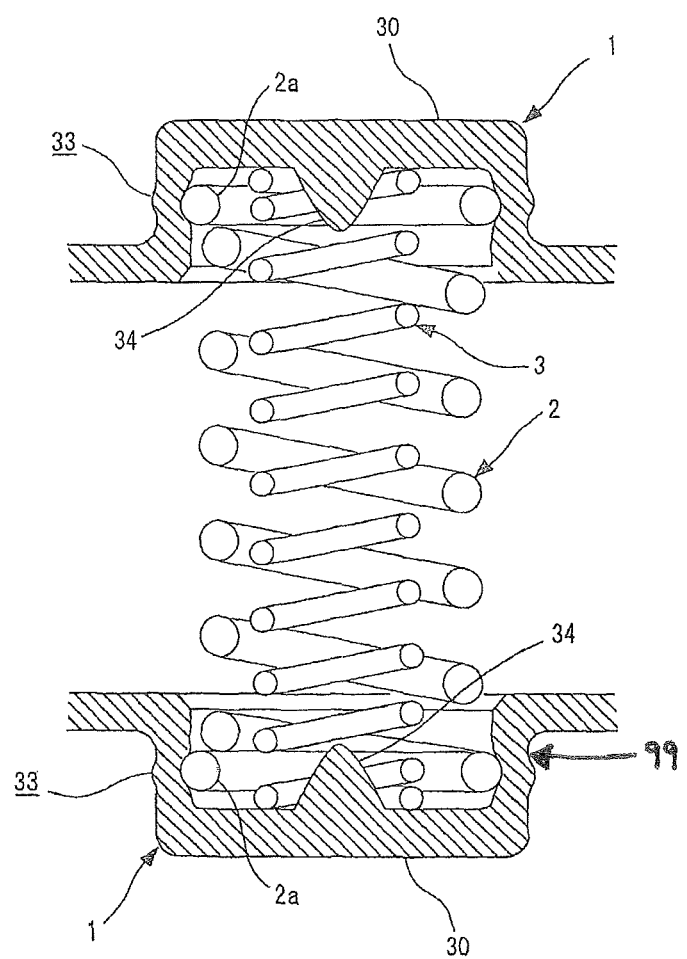
FIG. 7 is a front sectional view showing a modified example of the second embodiment according to the invention.

FIG. 7 shows a modified example of the second embodiment, in which, while the seat winding portion 2a of the coil spring 2 is fixed to the supporting recess 30, a second coil spring 3 having a smaller diameter is inserted within the coil spring 2, so as to increase the spring biasing force against the resin base plates 1. In addition, a protrusion 34 is formed at a central portion on an inner bottom surface of the supporting recess 30 of each of the resin base plates 1 so as to position the second coil spring 3. The second coil spring 3 is loosely fitted on the protrusion 34 at both end portions thereof so as to be centered in the supporting recesses 30.

The invention claimed is:

1. A spring assembly, comprising:
   resin base plates;
   a coil spring having seat winding portions fixed to the resin base plates; and
   a supporting projection formed on each of the resin base plates so as to be fitted with the seat winding portion of the coil spring, the supporting projection including:
   a distal end portion having rigidity so as not to deflect against a spring force applied radially inwards from the seat winding portion of the coil spring;
   a proximal end; and
   an elastic deflectable area formed within an area which extends from the proximal end to the distal end portion so as to deflect elastically by the spring force applied radially inwards from the seat winding portion of the coil spring, wherein, in the coil spring,
- the seat winding portion is contracted diametrically more than an intermediate winding portion,
- a bore diameter of the seat winding portion is made smaller than an outside diameter of the distal end portion of the supporting projection, and
- a bore diameter of the intermediate winding portion is made larger than the outside diameter of the distal end portion of the supporting projection, whereby the coil spring is fitted on the distal end portion of the supporting projection while being expanded elastically, wherein a contracted portion is formed in the elastic deflectable area by fitting the seat winding portion of the coil spring on the supporting projection until reaching the elastic deflectable area, and when the contracted portion is formed, the distal end portion functions as a stopper to prevent dislocation of the coil spring from the supporting projection, and wherein, when fitting the seat winding portion of the coil spring onto the supporting projection, the distal end portion of the supporting projection abuts with an inner circumferential surface of the seat winding portion of the coil spring through its entire inner circumference to thereby outwardly expand the seat winding portion of the coil spring.

2. The spring assembly according to claim 1, wherein the supporting projection is hollowed at least in an area corresponding to the elastic deflectable area, and a circumferential wall of the same area is thinned, so as to allow the circumferential wall to deflect elastically by the spring force applied radially inwards from the seat winding portion of the coil spring.

3. The spring assembly according to claim 1, wherein the supporting projection is hollowed at least in an area corresponding to the elastic deflectable area, and plural axial slits are formed in a circumferential wall of the same area, so as to allow the circumferential wall to deflect elastically by the spring force applied radially inwards from the seat winding portion of the coil spring.

4. The spring assembly according to claim 1, wherein the outside diameter of the distal end portion is equal to an outside diameter of the elastic deflectable area in a non-deflected state.

5. The spring assembly according to claim 1, wherein the supporting projection comprises a cylindrical shape having a constant outside diameter.

6. The spring assembly according to claim 1, wherein the elastic deflectable area and the distal end portion are sequentially disposed from the proximal end of the supporting projection to the distal end of the supporting projection.

7. The spring assembly according to claim 1, wherein a thickness of a circumferential wall of the elastic deflectable area is less than a thickness of the distal end portion.

8. The spring assembly according to claim 1, wherein the supporting projection is hollowed at least in an area corresponding to the elastic deflectable area, and a thickness of a circumferential wall of the same area is less than a thickness of the distal end portion.

9. The spring assembly according to claim 1, wherein the outside diameter of the distal end portion is substantially equal to an outside diameter of the elastic deflectable area.

10. A spring assembly, comprising:
    resin base plates;
    a coil spring including seat winding portions fixed to the resin base plates; and
    a supporting recess formed in each of the resin base plates so as to be fitted with the seat winding portion of the coil spring, a wall of the supporting recess including:
    an opening edge portion having rigidity so as not to deflect against a spring force applied radially outwards from the seat winding portion of the coil spring;
    a bottom portion; and
    an elastic deflectable area formed within an area of the wall of the supporting recess which extends from the bottom portion to the opening edge portion so as to deflect elastically by the spring force applied radially outwards from the seat winding portion of the coil spring, wherein, in the coil spring,
- the seat winding portion is expanded diametrically more than an intermediate winding portion,
- an outside diameter of the seat winding portion is made larger than a bore diameter of the supporting recess, and
- an outside diameter of the intermediate winding portion is made smaller than the bore diameter of the supporting recess, whereby the coil spring is fitted in the opening edge portion of the supporting recess while being contracted elastically, and wherein an expanded portion is formed on the elastic deflectable area by fitting the seat winding portion of the coil spring in the supporting recess until reaching the elastic deflectable area, and when the expanded portion is formed, the opening edge portion functions as a stopper to prevent dislocation of the coil spring from the supporting recess, and wherein, in a state where the seat winding portion of the coil spring is not fitted in the supporting recess, a bore diameter of the opening edge portion is substantially equal to a bore diameter of the elastic deflectable area.

11. The spring assembly according to claim 10, wherein at least an area of the supporting recess corresponding to the elastic deflectable area is configured of a thin cylindrical wall, so as to allow the cylindrical wall to deflect elastically by the spring force applied radially outwards from the seat winding portion of the coil spring.

12. The spring assembly according to claim 10, wherein at least an area of the supporting recess corresponding to the elastic deflectable area is configured of a cylindrical wall, and plural axial slits are formed in the cylindrical wall, so as to allow the cylindrical wall to deflect elastically by the spring force applied radially outwards from the seat winding portion of the coil spring.

13. The spring assembly according to claim 10, wherein the bore diameter of the opening edge portion is equal to a bore diameter of the elastic deflectable area in a non-deflected state, and
wherein the bore diameter of the opening edge portion increases as the opening edge portion extends away from the bottom portion.

14. The spring assembly according to claim 10, wherein the supporting recess comprises a cylindrical shape having a constant bore diameter.

15. The spring assembly according to claim 10, wherein the elastic deflectable area and the opening edge portion are sequentially disposed from the bottom portion of the supporting recess to a distal end of the supporting recess.

16. The spring assembly according to claim 10, wherein a thickness of a circumferential wall of the elastic deflectable area is less than a thickness of the opening edge portion.

17. The spring assembly according to claim 10,
wherein the wall of the supporting recess continuously extends from the resin base plate so that the opening edge portion is located within a range of a thickness of the resin base plate.

18. A spring assembly, comprising:
resin base plates;
a coil spring having seat winding portions fixed to the resin base plates; and
a supporting projection formed on each of the resin base plates so as to be fitted with the seat winding portion of the coil spring, the supporting projection including:
   a distal end portion having rigidity so as not to deflect against a spring force applied radially inwards from the seat winding portion of the coil spring;
   a proximal end; and
   an elastic deflectable area which extends from the proximal end to the distal end portion so as to deflect elastically by the spring force applied radially inwards from the seat winding portion of the coil spring and has an outside diameter equal to an outside diameter of the distal end portion, the proximal end, the elastic deflectable area, and the distal end portion being sequentially disposed from the resin base plates;
   a groove which hollows an interior of the supporting projection and extends from a rear surface side of the resin base plates to an upper edge of the elastic deflectable area which contacts the distal end portion, a center axis of the groove being equally distance to outer edges of the supporting projection in a direction perpendicular to the supporting projection,
wherein, in the coil spring,
   the seat winding portion is contracted diametrically more than an intermediate winding portion,
   a bore diameter of the seat winding portion is made smaller than the outside diameter of the distal end portion of the supporting projection, and
   a bore diameter of the intermediate winding portion is made larger than the outside diameter of the distal end portion of the supporting projection, whereby the coil spring is fitted on the distal end portion of the supporting projection while being expanded elastically.

* * * * *